United States Patent
Bryant

(10) Patent No.: US 7,364,615 B1
(45) Date of Patent: Apr. 29, 2008

(54) METHOD OF FORMING PAVERS CONTAINING WASTE GLASS PARTICLES

(76) Inventor: Fulton L. Bryant, 2686 S. Hwy. 11, Rose Hill, NC (US) 28458

( * ) Notice: Subject to any disclaimer, the term of this patent is extended or adjusted under 35 U.S.C. 154(b) by 431 days.

(21) Appl. No.: 11/000,183

(22) Filed: Nov. 30, 2004

(51) Int. Cl.
*C04B 14/22* (2006.01)
*C04B 24/24* (2006.01)

(52) U.S. Cl. .................. 106/814; 427/403; 428/688; 524/2

(58) Field of Classification Search ........... 106/711, 106/814; 428/688; 427/403; 524/2
See application file for complete search history.

(56) References Cited

U.S. PATENT DOCUMENTS

| | | | |
|---|---|---|---|
| 5,291,694 A * | 3/1994 | Hosoya et al. ............ 451/38 |
| 5,367,007 A | 11/1994 | Richards | |
| 5,525,153 A * | 6/1996 | Cosola ................. 106/697 |
| 5,810,921 A | 9/1998 | Baxter et al. | |
| 6,024,635 A * | 2/2000 | Cruickshank et al. ....... 451/541 |
| 6,344,081 B1 * | 2/2002 | Pelot et al. ................. 106/711 |
| 6,387,504 B1 * | 5/2002 | Mushovic .................. 428/413 |
| 6,449,897 B1 | 9/2002 | Gaston | |
| 6,528,547 B2 * | 3/2003 | Shulman ..................... 521/54 |
| 6,572,927 B1 * | 6/2003 | Pleyers et al. ............ 427/393.6 |
| 6,699,321 B2 | 3/2004 | Pelot et al. | |
| 6,739,963 B1 * | 5/2004 | Mas Garcia ................ 451/541 |
| 2004/0106704 A1 * | 6/2004 | Meyer et al. .................. 524/2 |

* cited by examiner

*Primary Examiner*—Peter Szekely
(74) *Attorney, Agent, or Firm*—Coats & Bennett, P.L.L.C.

(57) ABSTRACT

A method for forming pavers includes mixing cement, water and sand to form a cement composition, and mixing waste glass particles with the cement composition to form a cement-glass particle composition. Thereafter the cement glass particle composition is poured into a mold and the composition is allowed to harden to form a molded cement glass particle block. Next the cement glass particle block is removed from the mold and sliced by cutting the cement glass particle block into a series of sections or component parts where each section or component part forms a paver. Thereafter at least one surface of the paver is ground to form a smooth surface that exposes the waste glass particles.

13 Claims, 3 Drawing Sheets

METHOD OF FORMING PAVERS CONTAINING WASTE GLASS PARTICLES

FIELD OF THE INVENTION

The present invention relates to pavers, stepping-stones and structures, and more particularly to a method of forming pavers and the like utilizing a cement composition and waste or recycled glass particles.

BACKGROUND OF THE INVENTION

Pavers, stepping-stones and the like are widely used around homes and buildings. In some cases pavers are used as driveways. They, of course, are functional inasmuch as they provide a hard surface upon which to walk or drive a vehicle. Pavers are also attractive in landscaping environments. For example, there are commercially available concrete pavers of various shapes, colors and sizes. However, pavers and stepping-stones typically used around pools, gardens, walkways and courtyards lack artistry. That is, they are generally plain and while aesthetically pleasing in certain environments, conventional pavers lack the ability to compliment and enhance landscapes.

Therefore, there has been and continues to be a need for a concrete paver or stepping stone that projects artistry and which has the ability to complement and enhance even the most sophisticated and intricate landscapes.

SUMMARY OF THE INVENTION

The present invention entails a paver that includes exposed waste glass particles that impart a pleasing, artistic appearance to the paver.

Accordingly, the present invention entails a method of forming a paver that includes mixing cement, water and sand to form a cement composition. To the cement composition there is mixed waste glass particles to form a cement glass particle composition. The cement glass particle composition is poured into a mold and allowed to harden to form a molded cement-glass particle block. After forming the cement-glass particle block, the block is removed from the mold and sliced into sections where the respective sections form two or more pavers. Thereafter, at least one surface of each paver is sanded or ground to form a smooth surface.

In one particular embodiment, after the surface of the paver has been sanded or ground, a sealant or sealing layer can be applied to the surface.

Further, the present invention entails a paver, a stepping stone or the like that comprises a hardened cement composition including cement, sand and water. Within the cement composition are glass particles that are dispersed throughout the composition. At least one surface, preferably the exposed surface, is ground or sanded to form a smooth surface.

In addition, the present invention may entail a method of forming a paver wherein the cement composition is mixed with waste plastic particles to form a cement plastic particle composition. Similar to the cement glass particle composition, the cement plastic particle composition is poured into a mold and allowed to harden to form a molded cement-plastic particle block. After forming the cement-plastic particle block, the block is removed from the mold and sliced into sections where the respective sections form two or more pavers.

Other objects and advantages of the present invention will become apparent and obvious from a study of the following description and the accompanying drawings which are merely illustrative of such invention.

DETAILED DESCRIPTION OF THE INVENTION

The present invention entails a method for producing a paver or a stepping-stone. As used herein the term "paver" is meant to encompass a stepping-stone. The method of the present invention entails forming a cement composition and mixing the cement composition with waste glass particles to form a cement-glass particle composition. As discussed below, the cement-glass particle composition is poured into a mold 12. Once in the mold 12 the cement-glass particle composition is allowed to stand and harden. After the cement-glass particle composition has hardened, it is removed from the mold 12 and is referred to as a cement-glass particle block 14. The cement-glass particle block 14 is then sliced or cut into sections or parts. These parts form individual pavers. Each paver has at least one surface that in a preferred embodiment is deemed an upper surface. This surface is ground or sanded smooth, leaving exposed the glass particles. The glass particles and the cement composition form a paver with a pleasing appearance.

Referring back to the cement composition, it is appreciated that such can be formulated and prepared by mixing concrete, sand and water. This is customarily achieved by depositing the cement, sand and water in a cement mixer. Components of the cement composition are mixed for an appropriate amount of time. In conventional fashion, color can be added to the cement composition.

The present invention entails the use of waste or recycled glass in the cement composition. The term waste or recycle as used herein means used glass, that is, glass not specifically made for use in pavers. Typically, households participate in glass recycling programs where recycled glass containers, for example are collected over a period of time by a recycler. Since recycling glass is so prevalent today, there is ample waste or recycled glass available from recyclers. In the case of the present invention, waste or recycled glass is collected and brought to a site where the cement composition is mixed. First, the waste glass is ground to a selected particle size. The particle size can vary from very fine glass to moderate size particles to even larger particles. The glass, after being ground, can be segregated according to particle size and even color. This enables one to achieve various looks by mixing various colors and sizes of glass particles in the concrete composition.

After the cement composition has been mixed, select glass particles are added. These glass particles are mixed with the cement composition for a selected period of time.

In many cases with a conventional cement mixer, the glass particles will be thoroughly mixed within the cement composition within two minutes.

Figure 1:
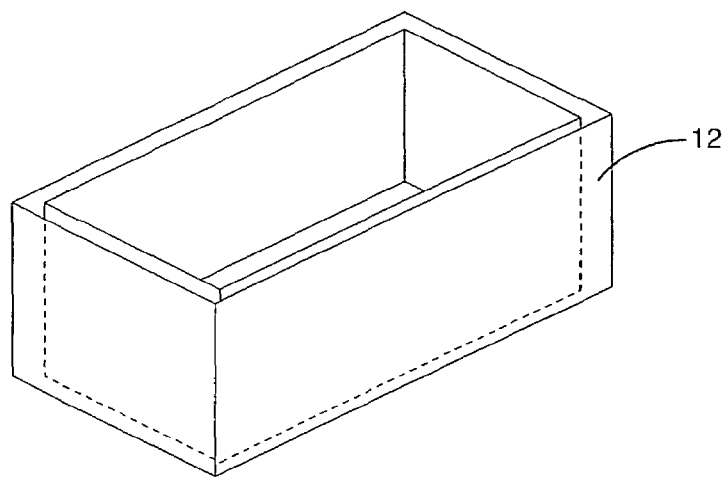
FIG. 1 is a perspective view of a mold for receiving the cement-glass particle composition.
Figure 2:
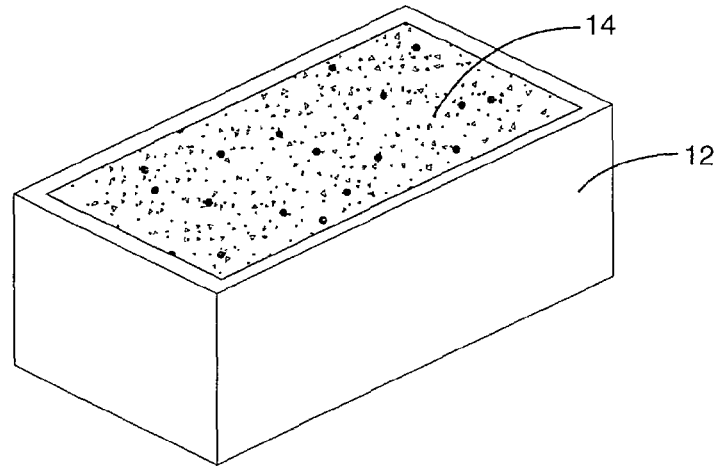
FIG. 2 is a perspective view of the mold having the cement-glass particle composition contained therein.

After the glass particles have been mixed with the cement composition, a cement-glass particle composition is formed. This cement-glass particle composition is poured into the mold 12. See FIG. 2. After the cement-glass particle composition is poured into a mold, the composition is allowed to set and harden for a period of time. The size of the mold 12 can vary depending on the particular size of product being manufactured. In the case of pavers, one appropriate size for the mold 12 is a mold 4 inches deep, 3½ inches wide and 6 inches long, as measured from the interior sides of the mold. This mold is illustrated in FIG. 2 of the drawings. Other size molds could be utilized.

The quantity of the respective components in the cement-glass particle composition can vary over a substantial range. In one embodiment, 7½ parts of cement is mixed with 30 parts of sand and 5½ parts of water. After these ingredients or components have been thoroughly mixed together, 15 parts of ground waste glass particles is added to the cement composition. The parts referred to herein are parts based on volume. In other examples, the cement can range from approximately 3 to 10 parts, the sand can range from approximately 15 to 40 parts, the water can range from approximately 2 to 10 parts, and the glass particles can range from approximately 5 to 30 parts. The glass particles are mixed with the cement composition until the glass particles are thoroughly and uniformly mixed throughout. In some cases, this can occur within a two-minute period of time. In other cases more time may be required to thoroughly mix the glass particles into the cement composition. As pointed out above, these are exemplary compositions and it should be understood and appreciated that the amount and proportions of these components can vary.

Figure 3:
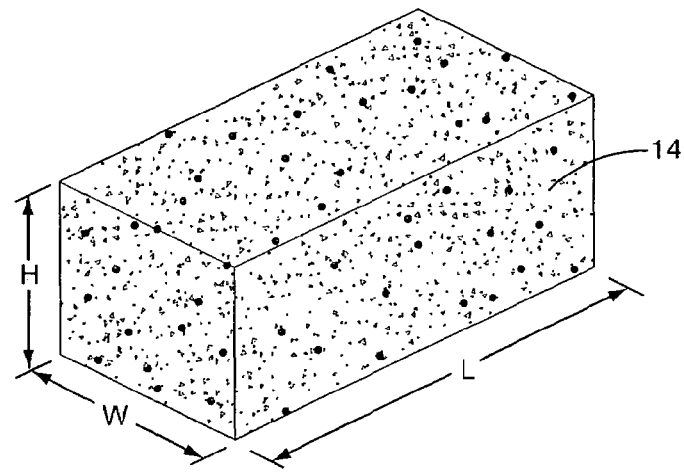
FIG. 3 is a perspective view showing the formed cement-glass particle block.
Figure 4:
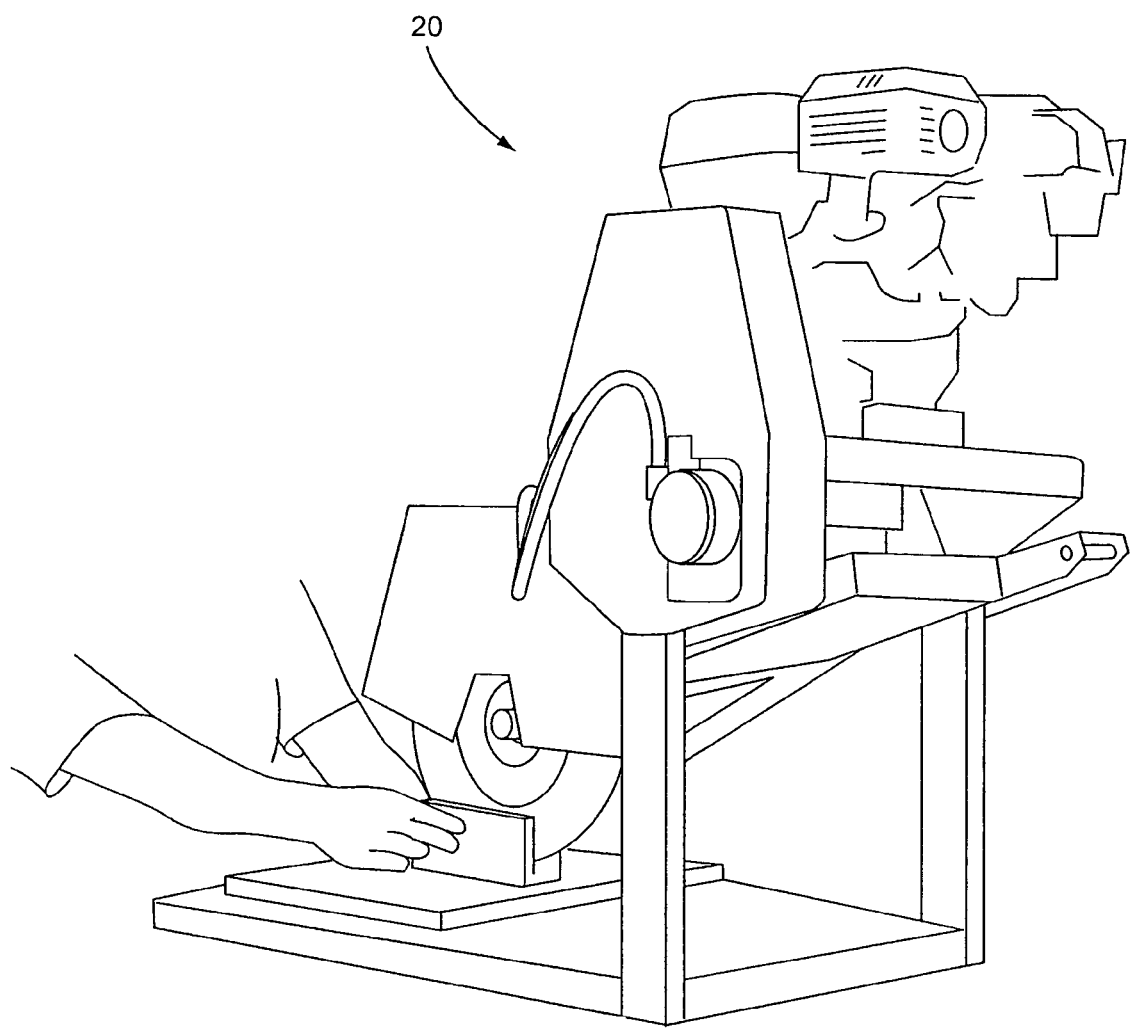
FIG. 4 is a perspective view showing the cement-glass particle block being cut by a concrete saw.
Figure 5:
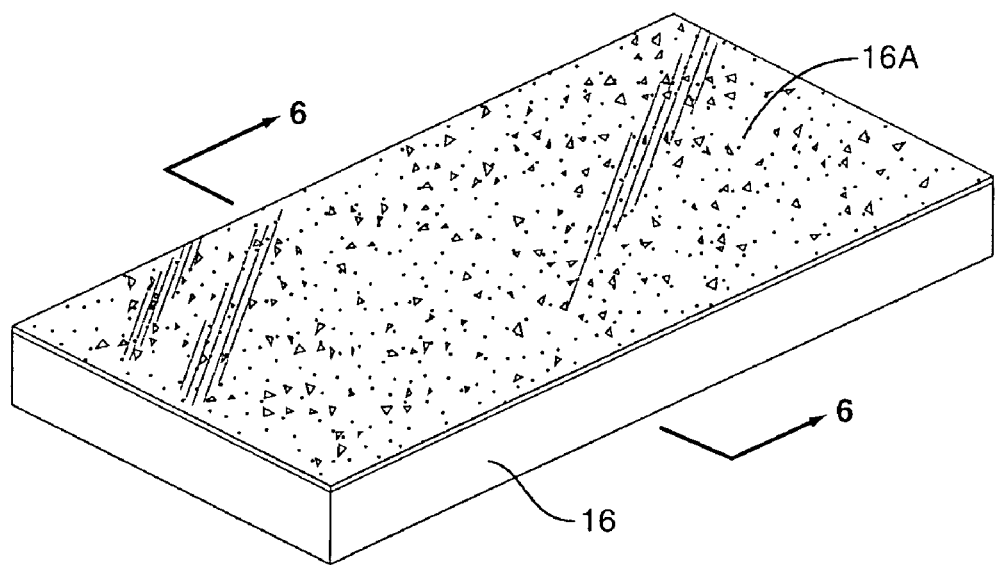
FIG. 5 is a perspective view of a paver formed according to the method of the present invention.

The cement-glass particle composition is allowed to stand and harden for a selected time period. After the elapse of the selected time period, the cement-glass particle composition is removed form the mold. Once the cement-glass particle composition has hardened, it is referred to as a cement-glass particle block and indicated in the drawings by the numeral 14. See FIG. 3. As seen in FIG. 3, the cement-glass particle block 14 assumes the shape and size of the mold 12. In the case of the example illustrated herein, the cement-glass particle block has a height H of 4 inches, a width W of 3½ inches and a length L of 6 inches.

Once the cement-glass particle block 14 has been formed it is sliced or cut to form the individual pavers. In the case of one process, the cement-glass particle block 14 is cut by utilizing a concrete saw 20. While the cuts or slices can be directed through the block 14 in any number of ways, in the case of the example illustrated herein, the cement-glass particle block is sliced horizontal or perpendicular to the height H of the cement-glass particle block 14. In the example given, the height of the block 14 is approximately 4 inches. An individual paver need only be approximately 1 inch. In this example, the cement-glass particle block 14 is cut or sliced in increments. This, of course, means that for a cement-glass particle block having a 4-inch height that 4 individual pavers can be gained from slicing the cement-glass particle block 14 as discussed herein. As noted above the height H and other dimensions of the cement-glass particle block 14 can vary as well as the thickness or other dimension of the individual pavers to be cut or formed from the block.

After the cement-glass particle block 14 has been sliced or cut, the individual cut sections or parts form pavers 16. Each paver 16 has at least one surface that is treated or conditioned. In the case of this example, the treated or conditioned surface is referred to as a top surface of the paver. When the cement glass particle block 14 is cut, the resulting cut surfaces of the respective pavers 16 may not be smooth and in fact, could have small areas of particles of glass exposed. Accordingly, the cut surfaces that are intended to be exposed are subjected to grinding or sanding. Various means can be employed to grind or sand the surfaces of the pavers 16 to form smooth surfaces. In one example, a concrete grinding rock can be utilized to grind and smooth the top surface of each paver 16. Alternatively, various types of abrasive pads and sandpaper can be utilized to sand and smooth the top surface.

The process of grinding or sanding the exposed or top surface of the pavers 16 will cause the surfaces to be smooth so as to avoid cuts or nicks from the exposurer to the surface itself. Further, the grinding or sanding has the effect of polishing and conditioning the individual glass particles in the composition such that they form shiny and aesthetically pleasing elements in the cement composition. The mixture of the cement composition and waste glass form random but extremely pleasing surfaces that can be altered by altering the sizes of the glass particles, the color of the glass particles, or the color of the cement composition. Indeed, different colored glass particles and different size glass particles can be mixed to form a variety of pleasing appearances.

Figure 6:
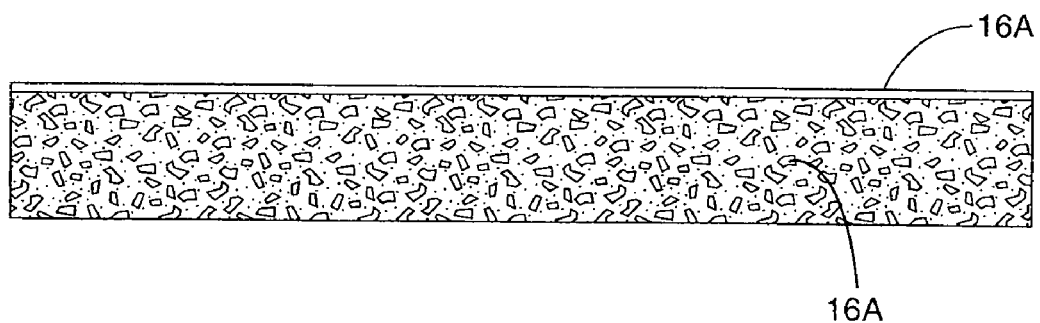
FIG. 6 is a sectional view taken through the line 6-6 of FIG. 5.

Finally, it may be appropriate or beneficial to seal the surface of the resulting paver 16. A sealant can be applied to the surface of the paver. In FIG. 6, a produced paver 16 is shown therein and includes a sealant layer 16A formed across the top surface of the paver.

The method of the present invention has many advantages including the advantage of utilizing waste glass. In addition, by varying the glass particle size and the color of the glass particles, a wide variety of pavers can be manufactured that will produce a pleasing and aesthetic appearance across the top surface of the respective pavers. The manufactured pavers can be used for sidewalks, porches, patios, and stepping-stones in the same ways as conventional pavers and stepping-stones are used. Another advantage of the present invention is that the resulting pavers are relatively inexpensive, particularly because they utilize waste or recycled glass.

The method and product described above entails mixing a cement composition with waste glass particles to form a cement glass particle composition. In addition to this method and resulting product, the present invention entails mixing the same cement composition with waste plastic particles to form a cement plastic particle composition. The waste plastic particles would originate from waste or recycled plastic containers, or other recycled or waste plastic products such as combs, toys, etc. The waste or recycled plastic products would be ground or cut into small plastic particles and mixed with the cement composition in the same manner as described above with respect to the glass particles. The same proportions by volume would apply to the plastic particles.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of forming a paver having cement and waste glass particles, consisting essentially of:
   a. mixing cement, water and sand to form a cement composition;
   b. mixing waste glass particles with the cement composition to form a cement-glass particle composition;
   c. pouring the cement-glass particle composition into a mold;
   d. hardening the cement-glass particle composition in the mold to form a molded cement-glass particle block;
   e. removing the molded cement-glass particle block from the mold;
   f. slicing the molded cement-glass particle block into sections to form a plurality of pavers;
   g. treating at least one surface of respective pavers to form a smooth surface; and
   h. wherein the cement-glass particle composition comprises approximately 3 to 10 parts cement, approximately 15 to 40 parts sand, approximately 2 to 10 parts water, and approximately 5 to 30 parts glass particles.

2. The method of claim 1 wherein treating at least one surface of the pavers to form a smooth surface includes grinding at least one surface of the pavers to remove pointed or sharp pieces of particles of glass.

3. The method of claim 2 wherein grinding the surface of the pavers includes engaging the surface of the pavers with a grinding rock.

4. The method of claim 2 wherein grinding the surface of the pavers includes engaging the surface of the paver with sandpaper and moving the sandpaper over the surface of the pavers.

5. The method of claim 1 further including sealing the smooth surface of the pavers.

6. The method of claim 1 wherein the mold has a depth of at least four inches and wherein the molded cement glass-particle block includes a height of at least four inches.

7. The method of claim 1 wherein slicing the molded cement-glass particle block includes cutting the block into a series of slices.

8. The method of claim 1 including slicing the cement-glass particle block generally normal to the height of the cement-glass particle block.

9. The method of claim 8 wherein the method includes slicing the molded cement glass particle block into at least three pavers.

10. The method of claim 1 wherein the cement-glass particle composition comprises approximately 7½ parts cement, approximately 30 parts sand, approximately 5½ parts water, and approximately 15 parts glass particles.

11. The method of claim 1 including grinding whole glass containers into glass particles and mixing those glass particles with the cement composition.

12. A method of forming a paver having cement and waste plastic particles, consisting essentially of:
   a. mixing cement, water and sand to form a cement composition;
   b. mixing waste plastic particles with the cement composition to form a cement-plastic particle composition;
   c. pouring the cement-plastic particle composition into a mold;
   d. hardening the cement-plastic particle composition in the mold to form a molded cement-plastic particle block;
   e. removing the molded cement-plastic particle block from the mold;
   f. slicing the molded cement-plastic particle block into sections to form a plurality of pavers and;
   g. wherein the cement-plastic particle composition comprises approximately 3 to 10 parts cement, approximately 15 to 40 parts sand, approximately 2 to 10 parts water, and approximately 5 to 30 parts plastic particles.

13. The method of claim 12 including treating at least one surface of respective pavers to form a smooth surface.

* * * * *